(12) United States Patent
Damodaran et al.

(10) Patent No.: US 12,399,712 B2
(45) Date of Patent: *Aug. 26, 2025

(54) CONFIGURATION ITEMS FOR SUPPORTING AUTOMATIONS AND EFFICACIES THEREOF

(71) Applicant: ServiceNow, Inc., Santa Clara, CA (US)

(72) Inventors: Praveen Minnikaran Damodaran, Hyderabad (IN); Sameer Nalla, Hyderabad (IN); Rathijit Sarkar, Hyderabad (IN); Eric Schroeder, San Diego, CA (US); Binny Bhatnagar, Pleasanton, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/731,526

(22) Filed: Jun. 3, 2024

(65) Prior Publication Data
US 2024/0319995 A1    Sep. 26, 2024

Related U.S. Application Data

(63) Continuation of application No. 17/957,246, filed on Sep. 30, 2022, now Pat. No. 12,039,328.

(51) Int. Cl.
*G06F 8/77* (2018.01)
*G06F 8/71* (2018.01)

(52) U.S. Cl.
CPC . *G06F 8/77* (2013.01); *G06F 8/71* (2013.01)

(58) Field of Classification Search
CPC .............. G06F 8/71; G06F 8/77; G06F 8/329
See application file for complete search history.

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 A2 | 6/1991 |
| EP | 1607824 A2 | 12/2005 |

(Continued)

OTHER PUBLICATIONS

Vaibhav Sundriyal et al.; Automatic runtime frequency-scaling system for energy savings in parallel applications; Springer; pp. 777-797; retrieved on Apr. 24, 2025 (Year: 2013).*

*Primary Examiner* — S. Sough
*Assistant Examiner* — Cuong V Luu
(74) *Attorney, Agent, or Firm* — McDonnell Boehnen Hulbert & Berghoff LLP

(57) ABSTRACT

An embodiment may involve persistent storage containing one or more tables, wherein the tables include entries that specify automations, wherein the automations are software applications. One or more processors are configured to: receive a specification for a new automation, wherein the specification includes a frequency at which the new automation is to be executed, and expected time or resources saved per execution; generate an automation request within the tables, wherein the automation request includes the frequency and the expected time or resources saved; generate a reference from the automation request to an automation configuration item (CI) in the tables, wherein the automation CI represents a software application used to perform the new automation; cause the software application to execute at least part of the new automation and in accordance with the frequency; and measure actual time or resources saved per execution of the new automation.

20 Claims, 11 Drawing Sheets

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller, II et al. |
| 5,949,976 A | 9/1999 | Chappelle |
| 5,978,594 A | 11/1999 | Bonnell et al. |
| 6,021,437 A | 2/2000 | Chen |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,328,260 B1 | 2/2008 | Muthiyan et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B1 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,069,737 B1 | 6/2015 | Kimotho et al. |
| 9,971,826 B1 | 5/2018 | Belmar |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 10,999,152 B1 | 5/2021 | Bar Oz et al. |
| 11,025,481 B1 | 6/2021 | Louca et al. |
| 11,089,115 B2 | 8/2021 | Garty et al. |
| 11,095,506 B1 | 8/2021 | Erblat et al. |
| 11,275,580 B2 | 3/2022 | Tamir et al. |
| 11,277,475 B1 | 3/2022 | Tal et al. |
| 11,281,442 B1 | 3/2022 | Tal et al. |
| 11,294,666 B1 | 4/2022 | Look |
| 11,294,723 B1* | 4/2022 | Mathew ............... G06N 3/006 |
| 11,296,922 B2 | 4/2022 | Leibkowiz et al. |
| 11,301,503 B2 | 4/2022 | Burli |
| 11,379,089 B2 | 7/2022 | Goswami et al. |
| 11,451,573 B2 | 9/2022 | Waplington |
| 11,470,107 B2 | 10/2022 | Waplington |
| 11,582,106 B2 | 2/2023 | Hameiri et al. |
| 11,616,690 B2 | 3/2023 | Feiguine et al. |
| 11,620,128 B1 | 4/2023 | Chawda |
| 11,630,717 B2 | 4/2023 | Vutukuru et al. |
| 11,632,303 B2 | 4/2023 | Bitterfeld et al. |
| 11,640,369 B2 | 5/2023 | Bhogle et al. |
| 11,671,444 B2 | 6/2023 | Waplington |
| 11,695,641 B2 | 7/2023 | Bar Oz et al. |
| 11,829,233 B2 | 11/2023 | Watkins et al. |
| 11,868,593 B2 | 1/2024 | Bradley et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0288053 A1 | 12/2006 | Holt et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2012/0159209 A1 | 6/2012 | Stemen |
| 2013/0117435 A1 | 5/2013 | Shen |
| 2013/0283273 A1 | 10/2013 | Miyazaki |
| 2014/0122427 A1 | 5/2014 | Dary |
| 2018/0123940 A1 | 5/2018 | Rimar et al. |
| 2019/0073257 A1 | 3/2019 | Dasgupta et al. |
| 2019/0104398 A1 | 4/2019 | Owen et al. |
| 2019/0129739 A1 | 5/2019 | Al Reza et al. |
| 2019/0149515 A1 | 5/2019 | Sharma et al. |

(56) References Cited

U.S. PATENT DOCUMENTS

| | | |
|---|---|---|
| 2019/0165957 A1 | 5/2019 | Abbott et al. |
| 2019/0342162 A1 | 11/2019 | Bendre et al. |
| 2020/0034462 A1 | 1/2020 | Narayanasamy et al. |
| 2020/0050689 A1 | 2/2020 | Tal et al. |
| 2020/0204443 A1 | 6/2020 | Bar Oz et al. |
| 2020/0301678 A1 | 9/2020 | Burman et al. |
| 2021/0097168 A1 | 4/2021 | Patel et al. |
| 2021/0194764 A1 | 6/2021 | Badyan et al. |
| 2021/0294597 A1* | 9/2021 | Nasu ................... G06F 9/46 |
| 2022/0029886 A1 | 1/2022 | Hameiri |
| 2022/0303352 A1 | 9/2022 | Herzog et al. |
| 2023/0229542 A1 | 7/2023 | Watkins et al. |

FOREIGN PATENT DOCUMENTS

| | | |
|---|---|---|
| WO | 9934285 A1 | 7/1999 |
| WO | 0052559 A1 | 9/2000 |
| WO | 0179970 A1 | 10/2001 |

\* cited by examiner

Future automations 920

New requests by department 922

- Finance 2 100%
- HR 2 100%
- Legal 2 100%
- IT 2 100%
- DevOps 2 100%

10

Requests by intake source 924

Process Optimization
Manual

HR, Sales, IT, Legal, Finance, Marketing
Department vs Automation requests

Requests to be deployed 926

25

- In progress 15 67%
- Planned 10 33%

928

Most recent requests

| Name | Department | Frequency | Actual time spent per run | Actual cost per run | User impacted | Complexity | Rank | Priority |
|---|---|---|---|---|---|---|---|---|
| User password reset | HR | Hourly | 100 | 100 | 100 | 10 | 1 | 1 - Critical |
| New user accounts | Sales | Daily | 90 | 90 | 90 | 9 | 2 | 1 - Critical |
| Extract rows from excel | IT | Weekly | 80 | 80 | 80 | 8 | 3 | 1 - Critical |
| Auto-reject tickets open by Bob | Legal | Monthly | 70 | 70 | 70 | 7 | 4 | 2 - High |
| Auto-reject requests | Finance | Annually | 60 | 60 | 60 | 6 | 5 | 2 - High |

Showing 1-5 of 80    |← ← 1 2 3 4 5 6 7 8 9 10 → →|    5 ▾ Records per page

FIG. 9B

CONFIGURATION ITEMS FOR SUPPORTING AUTOMATIONS AND EFFICACIES THEREOF

CROSS-REFERENCE TO RELATED APPLICATION

This application is a continuation of and claims priority to U.S. patent application Ser. No. 17/957,246, filed Sep. 30, 2022, which is hereby incorporated by reference in its entirety.

BACKGROUND

Robotic process automation (RPA), workflows, chatbots, process optimizers, and rich application programming interfaces (APIs) are just some technologies that are being used to automate processes in managed networks. Such automation technologies are often believed to save time and resources when employed across such a network. However, these benefits have yet to be quantified in an objective fashion. As the use of automations is becoming more widespread, there is a growing desire to better understand how automations impact the efficacy of various types of software applications and systems.

SUMMARY

It is expected that automating certain repetitive and/or complex tasks can ultimately save time and resources across a computing system. Nevertheless, before an automation can be executed, it needs to be defined, developed, integrated, tested, and deployed. Also, after an automation is in use, it may need further debugging and upgrading. Therefore, any savings of time and/or resources due to use of an automation should be significant enough to offset the overhead incurred in getting the automation to a point where it can be executed, as well as any ongoing maintenance required by the automation.

Further, different automations may save different extents of time and/or resources. Thus, employing certain automations may be more beneficial than employing others. Moreover, in a remote network management platform that hosts computational instances dedicated to a number of enterprises, automation efficacies experienced by some enterprises may be used to recommend automations for other, perhaps similarly-situated, enterprises.

The embodiments herein address these and possibly other deficiencies in current automation technology by storing, in a configuration management database (CMDB) or another type of database, a rich set of data relating to deployed automations. As the automations are executed, the database is updated with metrics relating to time spent and resources used by the automations (or, conversely, time saved and resources saved by the automations). This database can be mined to calculate the relative benefits of the automations, so that an enterprise can determine whether the automations are performing with reasonable efficacies. Further, the resulting efficacies of specific automations or classes of automations deployed across enterprises can be used to recommend the use of automations in other enterprises. A set of graphical dashboards that summarize this information may be presented to users.

Accordingly, a first example embodiment may involve persistent storage containing one or more tables, wherein the tables include entries that specify automations, and wherein the automations are software applications configured to execute on behalf of a managed network. The first example embodiment may also involve one or more processors configured to: receive a specification for a new automation, wherein the specification includes a frequency at which the new automation is to be executed, and expected time or resources saved per execution of the new automation; based on the specification, generate an automation request within the tables, wherein the automation request includes the frequency and the expected time or resources saved; generate a reference from the automation request to an automation configuration item in the tables, wherein the automation configuration item represents a software application used to perform the new automation; cause the software application to execute at least part of the new automation and in accordance with the frequency; measure actual time or resources saved per execution of the new automation; and provide, for display on a graphical user interface of a client device, at least one of the expected time or resources saved per execution of the new automation or the actual time or resources saved per execution of the new automation.

A second example embodiment may involve receiving a specification for a new automation, wherein the specification includes a frequency at which the new automation is to be executed, and expected time or resources saved per execution of the new automation, wherein persistent storage contains one or more tables, wherein the tables include entries that specify automations, and wherein the automations are software applications configured to execute on behalf of a managed network; possibly based on the specification, generating an automation request within the tables, wherein the automation request includes the frequency and the expected time or resources saved; generating a reference from the automation request to an automation configuration item in the tables, wherein the automation configuration item represents a software application used to perform the new automation; causing the software application to execute at least part of the new automation and in accordance with the frequency; measuring actual time or resources saved per execution of the new automation; and providing, for display on a graphical user interface of a client device, at least one of the expected time or resources saved per execution of the new automation or the actual time or resources saved per execution of the new automation.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 9B is another graphical user interface, in accordance with example embodiments.

DETAILED DESCRIPTION

Figure 1:
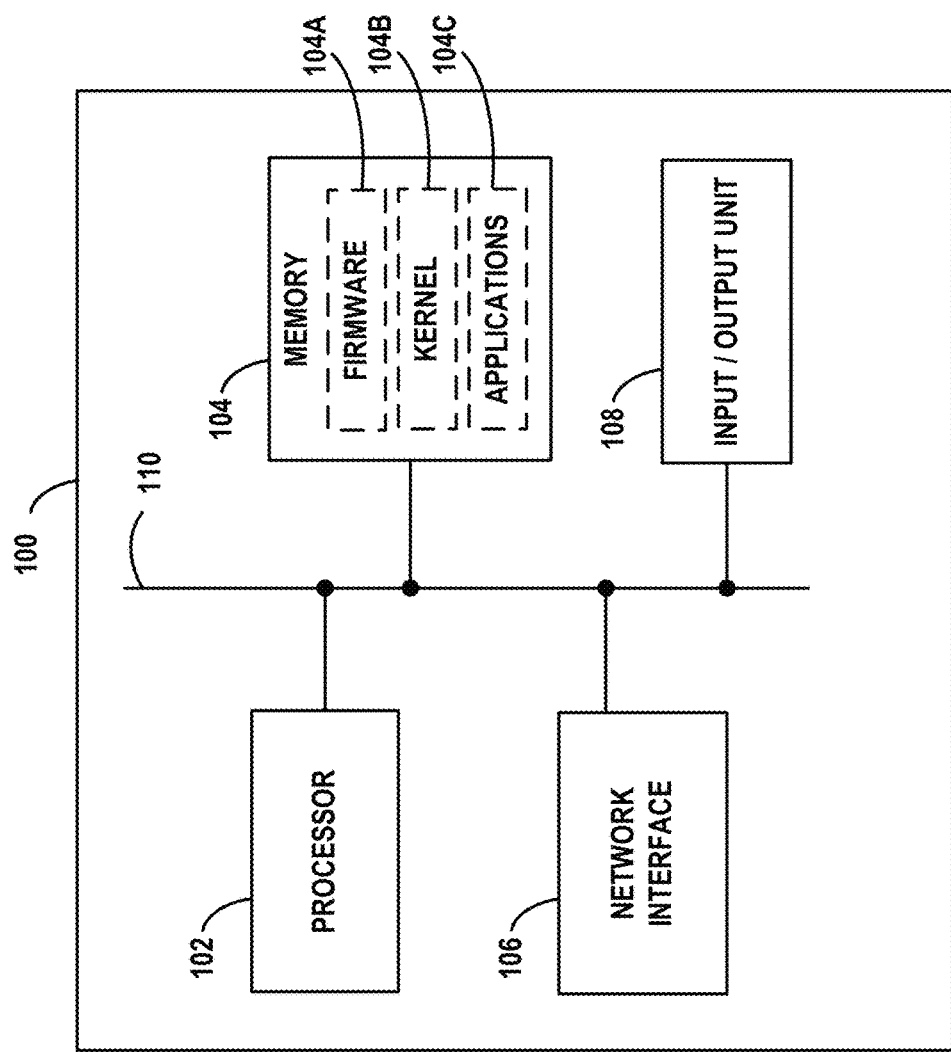
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
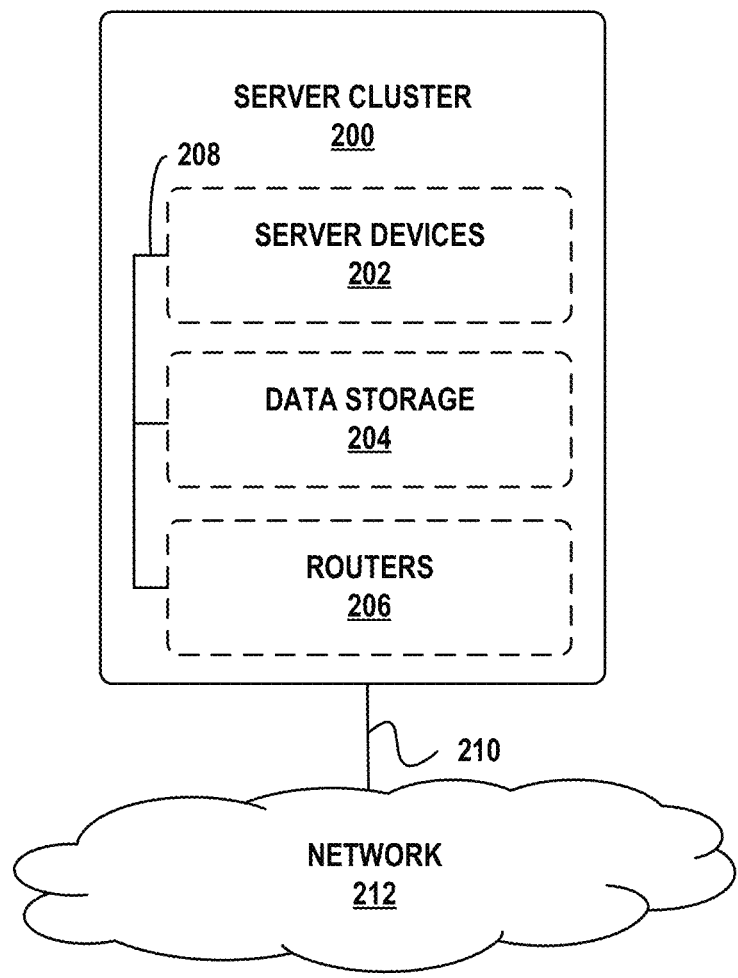
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
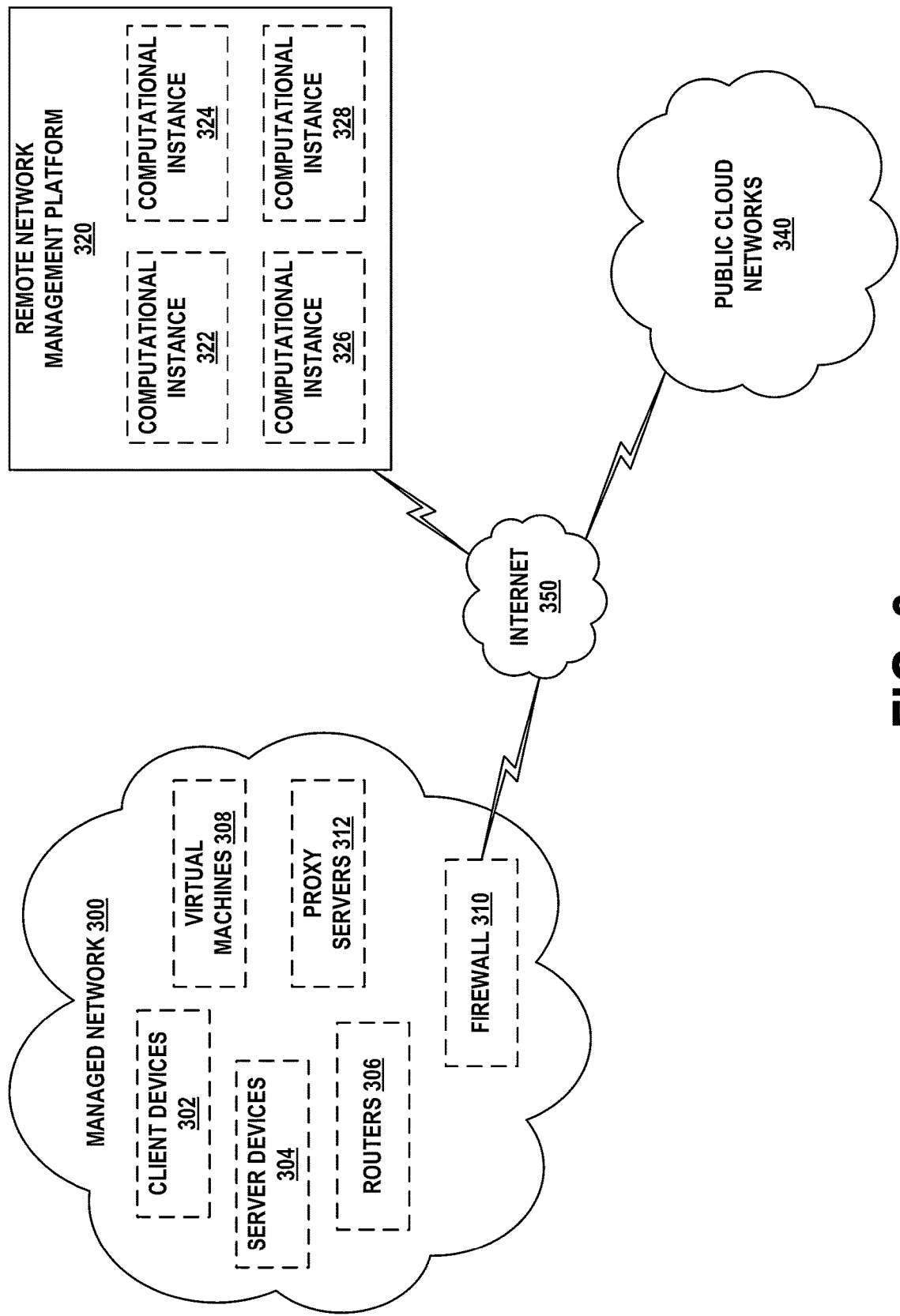
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
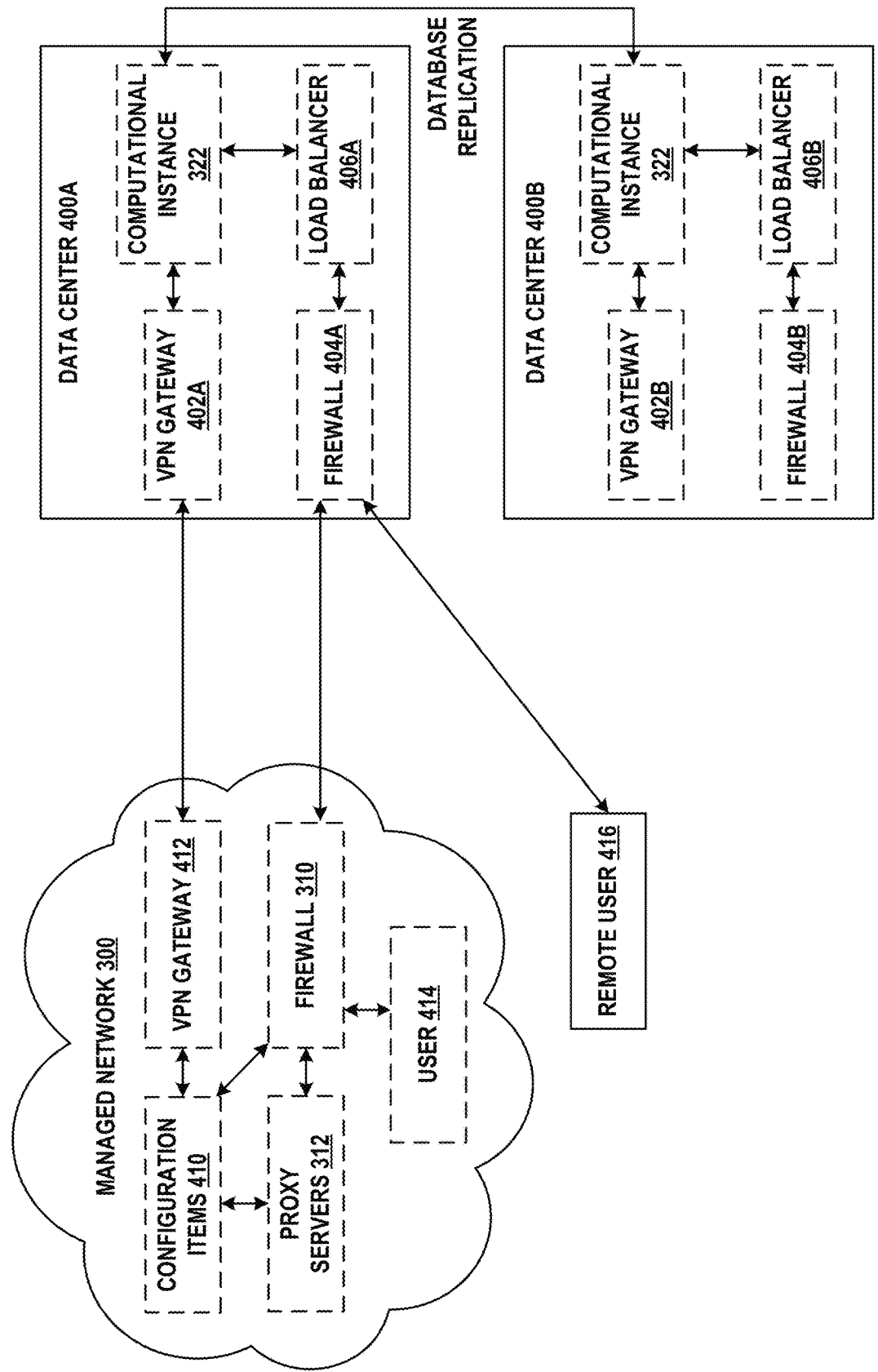
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
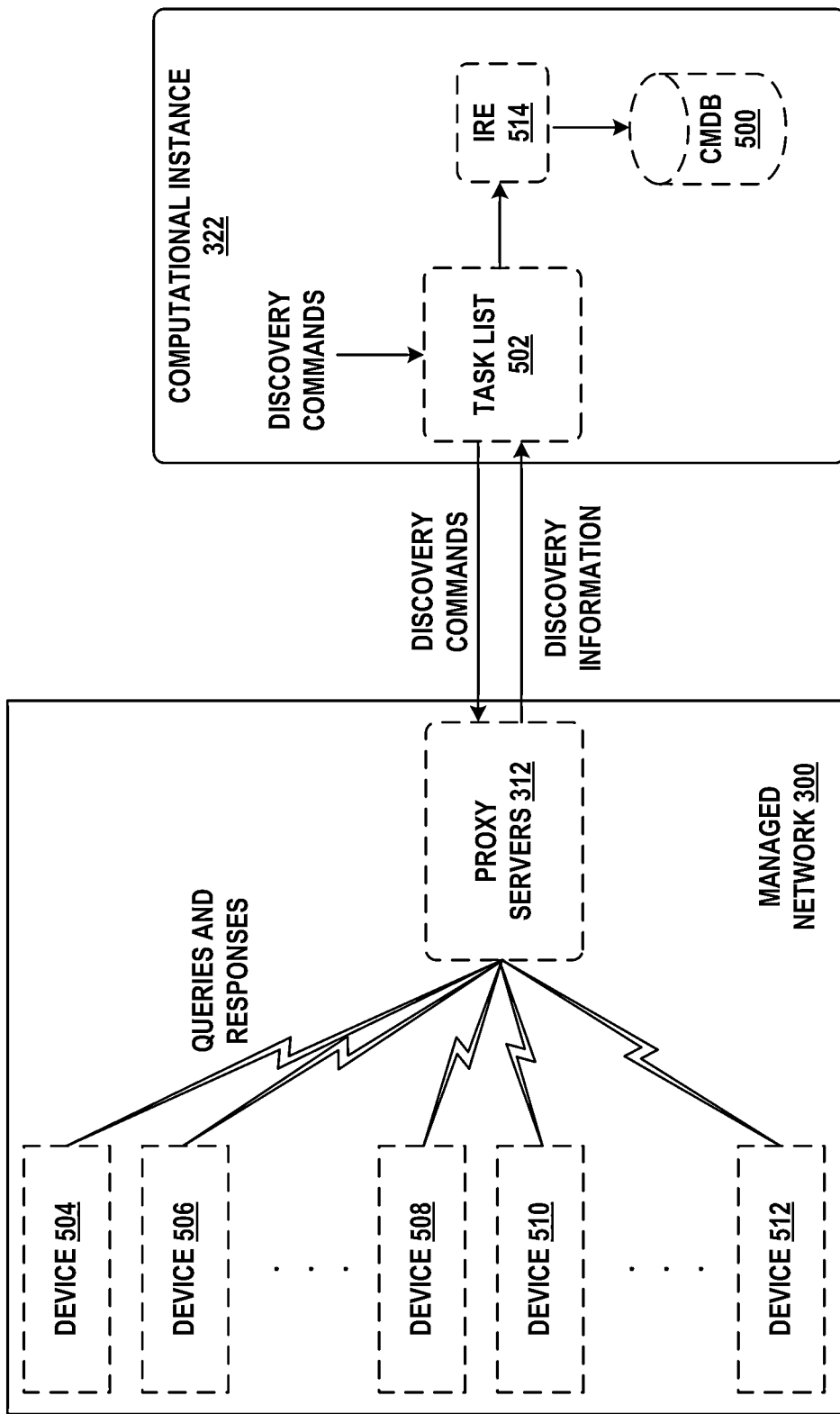
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Types of Automations

In the embodiments herein, an automation refers to a software application or a set of software applications that can be deployed on a computer network in order to perform certain tasks with little or no human interaction. The motivation for automation is largely in its ability to offload mundane work from various individuals. In this way, these individuals can spend more time on higher-level, complex tasks that are more difficult or impossible to automate. In some cases, automation may involve a degree of artificial cognition (e.g., by employing machine learning models) in order to make predictions or classifications.

The subsections below describe two types of automations for purposes of illustration: robotic process automation and workflows. Nonetheless, other types of automations may be possible, such as various types of automated document processing (e.g., extracting targeted information from documents using OCR and/or machine learning to identify and apply semantic meanings to the text therein), as well as chatbots (virtual agents that engage in automated dialogs with users), process optimizers (applications that analyze how tasks are performed by humans and/or software for bottlenecks and inefficiencies), automations created through low-code/no-code development techniques, and rich APIs. Any of these types of automations may be supplied by a remote network management platform, or by a third-party application that is integrated with the remote network management platform or deployed onto a managed network.

A. Robotic Process Automation

Robotic process automation (RPA) is a general term for the deployment and use of software "bots" that automate human-computer interaction and computer-computer interaction. These bots are based on a runtime framework of executable programmatic logic that takes the form of any type of software, such as a compiled program, interpreted script, client-server application, and so on. Thus, bots may be referred to as robots, software bots, software programs, or applications, for example.

The tasks that bots carry out may be simple, complex, or anywhere in between. Example tasks are candidates for RPA include data entry, scanning documents for keywords or phrases, sorting data into categories, moving files from one location to another, obtaining information from or writing information to a server or database, generating analytics, troubleshooting, synchronizing data, collecting data from multiple remote sources, and so on. It is possible for bots to perform a wide variety of additional tasks as well across many functions, such as IT, HR, finance, engineering, and/or customer service, just to name a few. The programmatic logic for these tasks may be deployed in packages that are provided to bots for execution.

One of the advantages of RPA comes from its ability to automate many of the routine, error-prone, frequent, and manual tasks that humans typically perform. This saves time and resources, allowing enterprises to focus on more strategic efforts to propel high-level and/or complex initiatives forward. Such automation may be full, in that a properly configured bot can carry out its activities without human intervention or with a minimal amount of human interaction (e.g., the human may initiate the bot and then the bot performs one or more tasks autonomously). On the other hand, such automation may be partial, in that a bot performs certain subtasks of an overall task while a human performs other subtasks of the overall task.

Regardless of its form, the automation provided by packages may involve rules-based processing, fuzzy logic, machine-learning-based predictions or classification, or other types of algorithms. In some cases, bots may interact with user interfaces, such as parsing prompts and entering data into forms.

Bots can be deployed onto various types of host computing devices. Once deployed, a bot can be assigned tasks to perform on its host. Such tasks can be manually initiated, initiated based on a pre-defined schedule, or initiated based on reception of a trigger (e.g., a request received from a remote device). Deployed bots can be managed in various ways (e.g., stopped, restarted, monitored, modified, etc.). In performing tasks, a bot may communicate with one or more other computing devices that are local or remote to the bot's host computing device (e.g., on the same local network, on the same enterprise network, in a public cloud network, or in a remote network management platform). In some cases, bots may interact with other bots.

In some embodiments, bots may be implemented as fungible units of execution (e.g., one or more operating system processes or threads) that are provided with various rules, scripts, logic, instruction sets, and/or software packages that define tasks. In other words, such a bot may be initiated but idle until it is assigned a task and caused to execute the task. The bot would then execute the task and, upon completion, return its idle state. Then, the bot can be caused to execute the same task again or be assigned a different task.

Bots are typically deployed on a managed network, but may have the ability to be controlled by a remote network management platform. Thus, a remote network management platform may assign tasks to bots, and control when the bots carry out these tasks. Further, the bots may report telemetry data and other performance metrics to the remote network management platform during and/or after their execution.

B. Workflows

Workflows can be automated or semi-automated multi-step processes that are defined to occur between any combination of people and computing systems. A given organization can routinely use a large number of workflows for various purposes, such as HR onboarding, expense approvals, and IT incident management just to name a few.

Workflows may be defined by way of a remote network management platform as state diagrams. Thus, each workflow may have a number of states and transitions therebetween. Certain automated actions may be performed in various states, such as setting values, executing a script, sending a notification, starting or stopping a timer, communicating with third-party remote servers, transitioning to a different state, and so on. Other actions may be triggered by state transitions. Some of these actions may involve waiting for user input, while others could be automated.

These workflows may be executed by a computational instance. Thus, users may interact with workflows by way of one or more user interfaces of the computational instance. This may involve a user being notified by the computational instance (e.g., via email) that their input is needed for a particular work item that is in a particular state of a workflow. The user can then log on to the computational instance and enter the requested input through an appropriate user interface. In some cases, the user may also be able to view other parts of the workflow related to the work item, e.g., its values or actions from other states and/or a representation of its history.

RPA and workflows can be combined in various ways. For example, bots may be used to carry out the processing of one or more states of a workflow and/or that of the transitions between states that takes place on a managed network. Alternatively or additionally, bots may be used to coordinate the performance of two or more workflows. Other possibilities exist.

VII. Data Gathering by Automations for Reporting and Recommendations

As described further below, data related to each task carried out by a bot and each work item that is processed by a workflow may be logged, saved, or otherwise stored by a computational instance of remote network management platform (e.g., the computational instance controlling the bots and hosting the workflow). For example, bots may generate logs that record certain activities carried out by the bot with associated timestamps of when these activities occurred. Such logs may be provided to the computational instance periodically or from time to time. In the case of workflows, data related to the states and transitions used by each work item, how much time each work item stays in each state, the user or users associated with each work item, and so on may be written to one or more additional logs. Regardless of whether the logs contain information relating to bots, workflows, both, or other types of automations, they may exist as files in a filesystem, entries in a database, or in some other form.

Such logs can later be mined for information regarding how the bots and/or workflows perform in practice. This data mining can be used to identify bottlenecks and other inefficiencies that are areas in which improvements to the bots and/or workflows could possibly be made. For example, scripts on the computational instance could be automatically executed, on demand or periodically, to process the logs and output a representation of operational aspects of the bots and/or workflows. Such processing may also determine or help determine the amount of time and/or resources used or saved by each automation. The resulting conclusions can be presented to one or more users as reports and/or recommendations.

Figure 6:
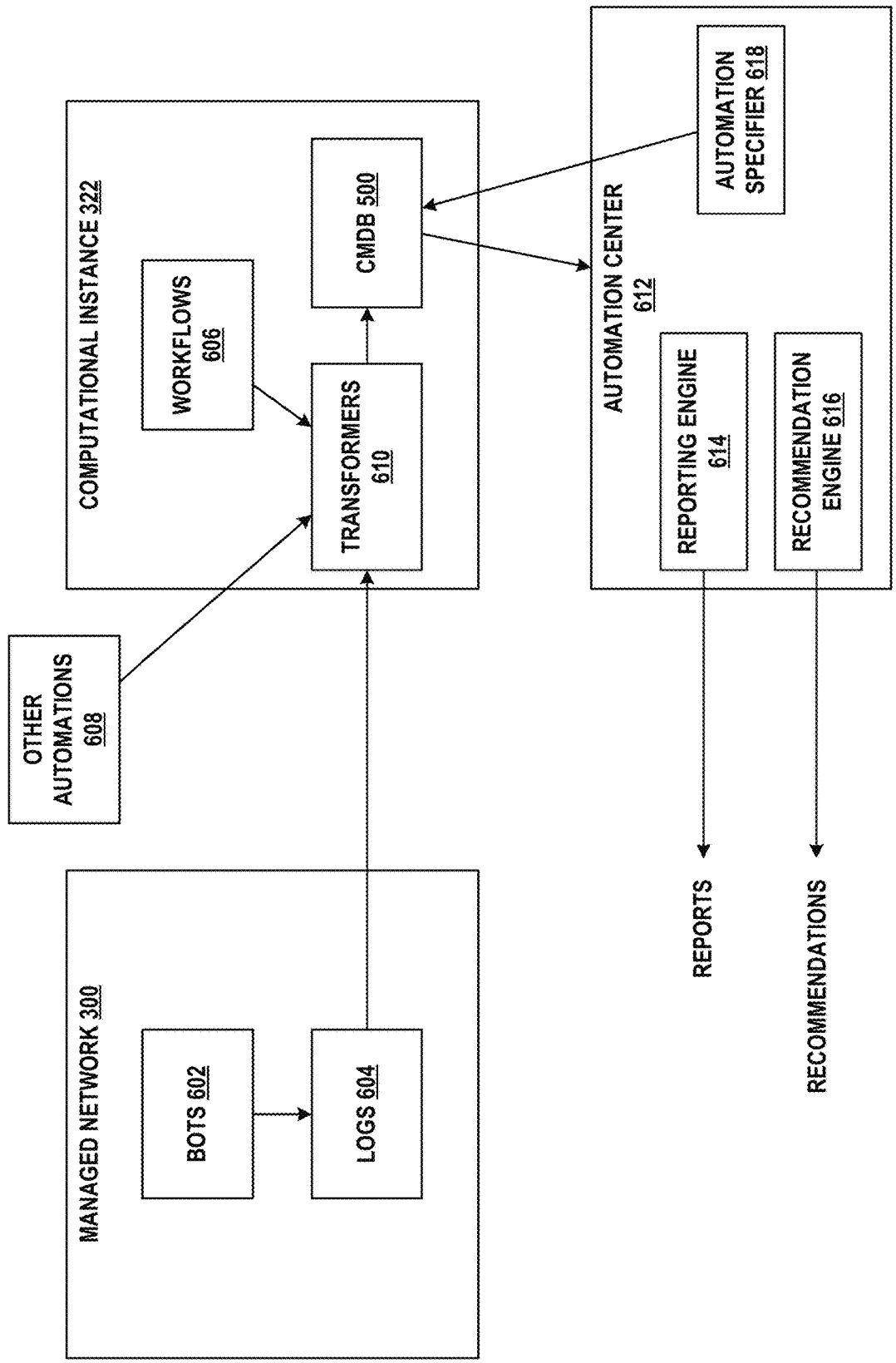
FIG. 6 depicts a computing environment that can support various types of automations, in accordance with example embodiments.

FIG. 6 depicts an example block diagram of such a system. As noted above, managed network 300 may contain bots 602. These bots may generate log data representing aspects of their operations. This log data may be stored in logs 604. Computational instance 322 may include workflows 606. These workflows may also generate representations of their operation (e.g., log files or other forms). Other automations 608 may be deployed on or externally to computational instance 322 (only the case of external deployment is illustrated in FIG. 6). Other automations 608 may also generate representations of their operation (e.g., log files or other forms).

The representations of the operation of bots 602, workflows 606, and other automations 608 may include timestamps of when each automation began, when the automation completed, resources used by the automation, resources saved through use of the automation, a value provided by the automation, a value saved through use of the automation, and/or other data. This information may be provided to transformers 610, which convert, process, or otherwise map the information into a standard form for storage in CMDB 500. To do so, transformers 610 may employ extract, transform, and load (ETL) procedures that can combine data from multiple sources into unified data storage. This data storage may be CMDB 500 as shown, or some other type of database. Such procedures may map the representations of the operation of bots 602, workflows 606, and other automations 608 into fields of database tables within CMDB 500, for example.

Once stored in CMDB 500 (or some other database), this information can be used to generate reports regarding the efficacy of automations, as well as to make recommendations regarding possible deployment of new or additional automations. Automation center 612 may be a software application or suite of software applications operating on computational instance 322, elsewhere in remote network management platform 320, or (as shown in FIG. 6) on a separate computing platform or system.

Automation center 612 may include reporting engine 614, recommendation engine 616, and automation specifier 618 among other possible functions. Each of these may be distinct software applications or modules within automation center 612.

Reporting engine 614 may generate reports relating to the efficacy of automations performed on behalf of managed network 300. This may include automations taking place within managed network 300 (e.g., bots 602), within computational instance 322 (e.g., workflows 606), other automations 608, or combinations thereof. These reports may compare the operation of such automations to predetermined automation goals, time saved by these automations, and/or resources saved by these automations. Examples of such reports are provided below.

Recommendation engine 616 may generate recommendations relating to potentially beneficial automations that could be performed on behalf of managed network 300. These recommendations may also be related to automations taking place within managed network 300 (e.g., bots 602), within computational instance 322 (e.g., workflows 606), other automation 608, or combinations thereof. The recommendations may be based on automation efficacy data gathered from other managed networks and/or computational instances.

For example, suppose that a particular RPA automation is deployed by 10 other managed networks (perhaps in the same industry segment as managed network 300) but not on managed network 300. Suppose further that reports from these other managed networks indicate that the RPA automation has resulted in saving more than a threshold amount of time and/or resources. Then, this RPA automation might be recommended for use on behalf of managed network 300.

Automation specifier 618 may use a web-based interface or another type of interface to receive specifications of automation requests and/or associated goals, and to manage these requests and/or goals throughout their lifecycles. Thus, input from a user may be received by automation specifier 618 and then be used to generate entries in automation-related database tables of CMDB 500.

VIII. Example Database Schema for Automations

Figure 7:
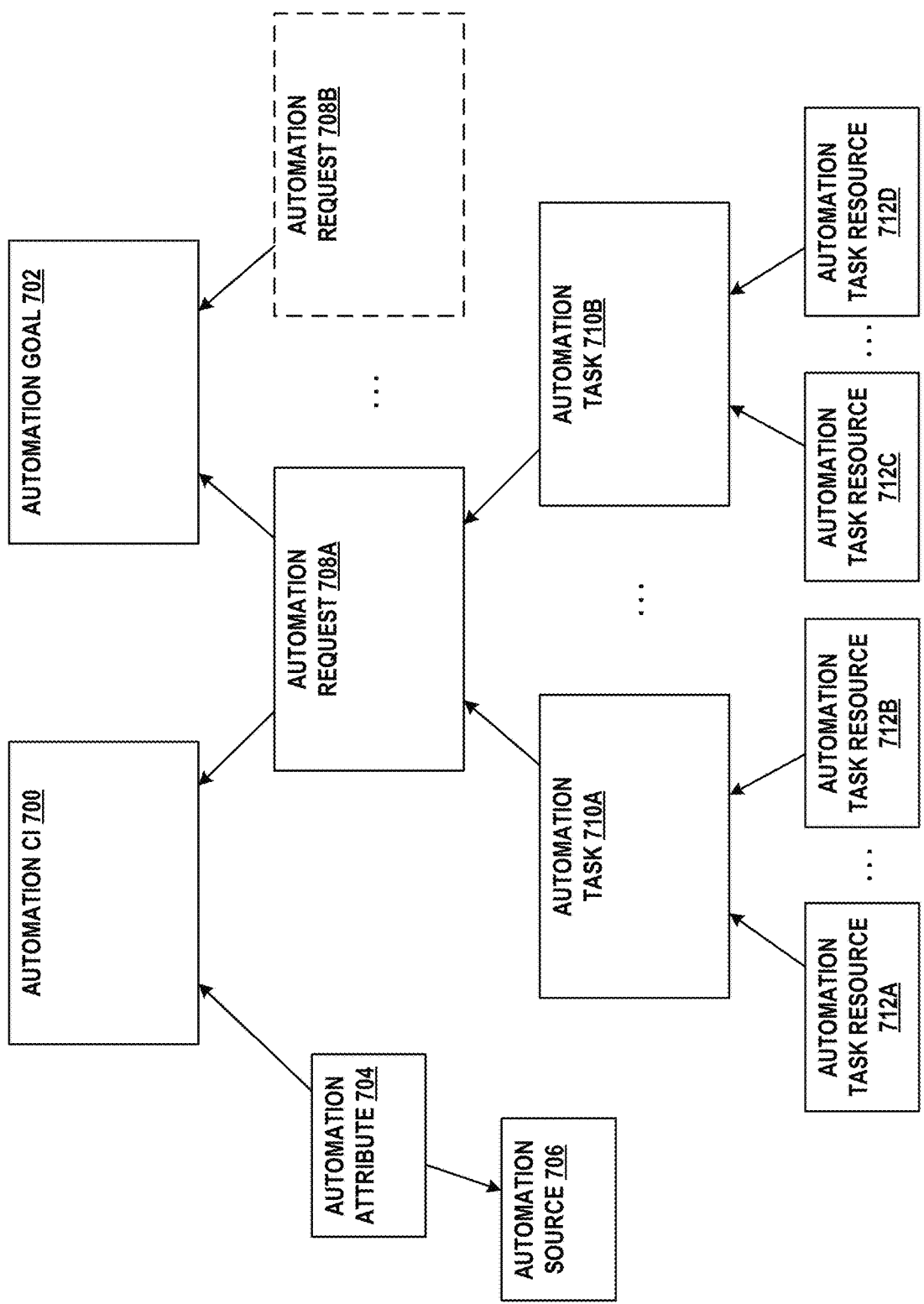
FIG. 7 depicts data structures that support automation lifecycles, in accordance with example embodiments.

FIG. 7 depicts an example data arrangement (i.e., based on a database schema) denoting entries in database tables and relationships (e.g., references) between these entries. These tables, in combination with other tables within a CMDB, facilitate the tracking, reporting on, and making recommendations about the efficacy of automations. Some of this information may be based on user input from automation specifier 618, some may be pre-defined, and some may be generated by various automations or automation-related applications.

Automation configuration item (CI) 700 is a configuration item, stored in an automation CI table, that represents an automation (e.g., bot, workflow, chatbot, etc.). This automation may have been developed by users of the computational instance or a deployed third-party automation.

Automation source 706, stored in an automation source table, defines the source of an automation specified by an automation CI. This could be the vendor of the associated automation or may indicate that the automation is custom-made or otherwise has no particular vendor.

Automation attribute 704, stored in an automation attribute table, specifies a set of performance information related to a specific automation CI that has a specific automation source. This information may include indications of: time saved per execution of the automation, resources saved per execution of the automation, a reference to the associated automation CI, and a reference to the associated automation source.

Automation goal 702 is an entry in an automation goal table, and contains a definition of a goal provided by a managed network or on behalf of a managed network. These goals specify automation objectives that the managed network would like to obtain. Accordingly, each goal may include a start date (at which tracking progress toward the goal begins), a target date (at which tracking toward the goal is hoped to be reached), and an end date (at which the goal has been achieved). In practice, the end date could be before or after the target date. Also, the end date may take on a null value until the goal is achieved. Each goal may also have an associated description as well as an owner (e.g., a user or group of users who are responsible for the goal), and a state (e.g., indicating whether the goal has been achieved, among other possibilities).

Each automation goal may be associated with one or more automation requests that are stored in an automation request table. For example, automation requests 708A and 708B may each have a reference pointing to automation goal 702. The ellipsis between automation requests 708A and 708B specify that zero or more automation requests may exist per automation goal. Notably, automation request 708B is shown in dashed lines to indicate that it is optional and also to indicate that any associated automation tasks will not be shown in FIG. 7 for purposes of convenience.

Automation requests may be thought of as general requirements that need to be published (e.g., placed in condition for execution) in order for the automation goal to be achieved. Thus, when all automation requests for a particular automation goal have been published, the state of the automation goal is updated to indicate that it has been achieved. In cases where the automation requests for the particular automation goal are not published at all or until after the automation goal's target date, the state of an automation goal may be updated to indicate that the goal has not been achieved.

Thus, each of automation requests 708A and 708B may include a unique identifier (to differentiate between automation requests), a reference pointing to the associated automation goal, a description, an owner, a state, a frequency at which the associated automation is executed (e.g., once per hour, one per day, once per week), the expected time spent per execution (e.g., in seconds or minutes), a criticality, an expected time savings per year (e.g., in hours or days), an expected time savings per execution, an expected resource savings per year (e.g., in terms of processing capacity, storage capacity, network capacity, or monetary value), and/or an expected resource savings per execution. Notably, these expected savings are estimates provided by the user who submits the automation request. Actual savings may differ (see below).

In more detail, the state of an automation goal may be one of new, pending, work in progress, achieved, or not achieved (other states are also possible). The state of an automation request may be one of new, deferred, rejected, planned, in progress, or published (other states are also possible). The following rules may be used to update the state of an automation goal based on the state(s) of its associate automation requests:

1: An automation goal can be in the pending state only as long as there is either no associated automation requests or if all associated automation requests are in one of the new, deferred, or rejected states.
2: An automation goal can be in the work in progress state only if at least one of its associated automation requests is in one of the planned, in progress, or published states.
3: An automation goal can be in the achieved state only if all the associated automation requests are in the published or rejected states with at least one of these in the published state.
4: An automation goal will move to the not achieved state if its target date has passed, unless it was already in the achieved state.

In order to facilitate such processing, the following checks may be made: (a) on change of the state of an automation request, the associated automation goal's state should be checked and updated if applicable, (b) on change of the reference in the automation request to the automation goal (the state of any previous and current automation goal should be checked and updated), and (c) on change of the target date of an automation goal (e.g., an automation goal may become ineligible for the not achieved state if its target date gets changed from the past to the future). Other possibilities exist.

Each automation request may be associated with one or more automation tasks that are stored in an automation task table. For example, automation tasks 710A and 710B may each have a reference pointing to automation request 708A. The ellipsis between automation tasks 710A and 710B specify that zero or more automation tasks may exist per automation request.

Automation tasks may be thought of discrete activities that need to be performed in order for the automation request to be achieved. Tasks can be a way to break an automation request into chunks that can be performed in parallel, by different computing resources, etc. Each of automation tasks 710A and 710B may include a unique identifier (to differentiate between automation tasks), a reference pointing to the associated automation request, a description, an owner, a state (indicating whether the task is in progress or achieved), and/or a priority.

Each automation task may be associated with one or more automation task resources, stored in an automation resource table, that represent entities that are expected to carry out the automation task. For example, automation task resources 712A and 712B may each have a reference pointing to automation task 710A, and automation task resources 712C and 712D may each have a reference pointing to automation task 710B. The ellipses between automation task resources 712A and 712B and between automation task resources 712C and 712D specify that zero or more automation task resources may exist per automation task.

Automation task resources may include indications of a unique identifier (to differentiate between automation task resources), a reference pointing to the associated automation task, a task resource type (e.g., an individual or group, etc.), an owner, and/or an indication of whether the automation task resource is currently active. For example, in the case that a needed automation has not yet been developed, its automation task resource may specify a user or group of users who are tasked with developing and/or deploying the automation. Similarly, in the case that an automation is deployed and requires monitoring, updates, or other types of maintenance, its automation task resource may specify a user or group of users who are assigned to do so.

Thus, task resources are used to put an automation in place, ready for deployment. They are distinct from the resource savings that execution of such automations are expected to provide.

The following simplified example illustrates how each of these table entries can be used. Suppose that a user submits an automation request to automatically perform optical character recognition (OCR) on a directory of documents once per day and then to move the OCRed versions of these documents to a different directory. The user may define a start date of Sep. 1, 2022, a target date of Oct. 1, 2022, and a description of "Automatically OCR documents downloaded from client". The user may also indicate that the expected time savings per year is 365 hours, the expected time savings per execution is 1 hour, the expected resource savings per year is $36,500, and the expected resource savings per execution is $100.

This user input may be used to define a new automation goal. The automation center application may generate a unique identifier for this automation goal, indicate that the user is the owner of the automation goal, and fill out other fields of the automation goal in accordance with the user's submission.

The automation center may also create a new automation request by generating a unique identifier for this automation request, and creating a reference from the automation request to the automation goal. The automation center may populate the automation request with the specified frequency, as well as the expected time savings per year, the expected time savings per execution, the expected resource savings per year, and the expected resource savings per execution. Other fields of the automation request may also be populated, such as setting the state of the automation request to pending.

In order to carry out the automation request, two automation tasks may be defined, one to OCR the documents and another to move the documents. Each may be assigned a different owner and an appropriate description. Each may also be updated to refer to the automation request. Further, each automation task may be associated with an automation task resource, who is a person assigned to put the automation in place (e.g., either by installing and configuring existing software or developing new software).

One or more new automation CIs may be generated to represent the automations used to carry out the automation request. Each automation CI may represent one distinct automation (e.g., bot or workflow) used by the automation request, or multiple distinct automations. Thus, in this example, the automation to OCR the documents and the automation to move the documents may be considered separate automations (and thus be specified in two different automation CIs) or a single automation (and thus be specified in one automation CI). An automation CI may include a unique identifier (to distinguish between automation CIs), a name of the automation, a vendor of the automation, a schedule at which the automation is to execute, and any other information needed or useful for identifying the automation.

Once the automation(s) are deployed, each execution of the automation is logged. While the executions may be planned according to a schedule (e.g., once per day), they may actually occur less frequently due to outages, network errors, software defects, and so on. For instance, over the course of a year the automation of this example might only execute 350 times instead of 365. Then, the actual time savings per year is 350 hours and the actual resource savings per year is $35,000, lower numbers than what was estimated.

Figure 8:
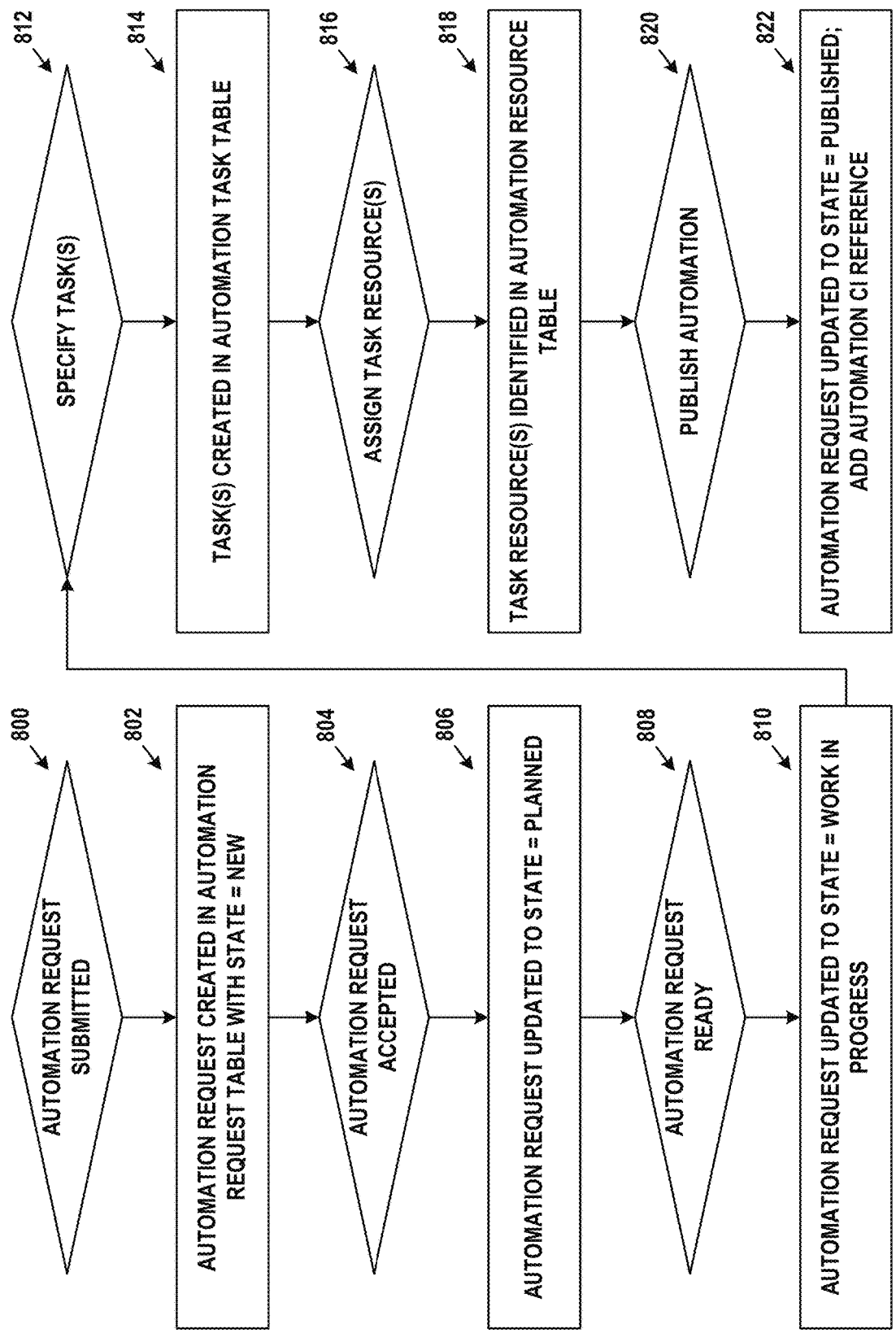
FIG. 8 is a flow chart of a possible automation lifecycle, in accordance with example embodiments.

For purposes of further illustration, an example lifecycle of an automation request is shown in FIG. 8. In this figure, rectangular-shaped blocks indicate actions performed by automation center 612 and/or associated applications, while diamond-shaped blocks indicate input from a user. For instance, the user may enter information into a graphical user interface of automation center 612. Nonetheless, other possibilities exist, including some activities in diamond-shaped blocks being performed by one or more software applications.

At block 800, an automation request is submitted. This submission may be made by a customer of a managed network, an employee of the managed network, or some other user. In some cases, an automation request may be submitted automatically, for instance by a processor optimization application.

At block 802, an automation request is created in the automation request table, possibly in response to the submission of the automation request. The state of this automation request may be set to new.

At block 804, the automation request is accepted. This acceptance may be indicated by a user who is responsible for serving the automation request.

At block 806, the state of the automation request is updated to planned. This update may occur in response to acceptance of the automation request.

At block 808, the automation request is indicated to be ready. This may be done by the user who is responsible for serving the automation request when the automation is ready to be worked on.

At block 810, the state of the automation request is updated to work in progress. This update may occur in response to the automation request being ready.

At block 812, one or more tasks to carry out the automation request are specified. This may be done by the user who is responsible for serving the automation request.

At block 814, these one or more tasks(s) are may be created in the automation task table. This may be done in response to specification of the one or more tasks.

At block 816, task resources are assigned to the one or more tasks. This may be done by the user who is responsible for serving the automation request or one or more users who are responsible for handling of the tasks.

At block 818, these task resources are identified as entries in the automation resource table. This may be done in response to assignment of the resources to the task(s).

At block 820, the automation is published. This may be done by the user who is responsible for serving the automation request.

At block 822, the state of the automation request is updated to published. This update may occur in response to the automation request being published. Further, a reference to one or more automation configuration items may be added to the automation request, wherein the automation configuration items represent discrete software applications that perform automations.

IX. Example Reporting Dashboards

As noted, the embodiments herein facilitate reporting on the progress, potential time and resources saved, and actual time and resources saved from use of automations. These embodiments also facilitate reporting on planned future automations and the priorities of such future automations. Such reporting is presented in the form of dashboards within graphical user interfaces. But these dashboards are presented for purposes of example, and reporting could occur using different information, different dashboard arrangements, or different graphical user interfaces altogether.

Note that the dashboards presented herein use mocked-up data, and therefore the data therein might not be consistent with one another. These dashboards may be provided by automation center 612, for example.

Figure 9A:
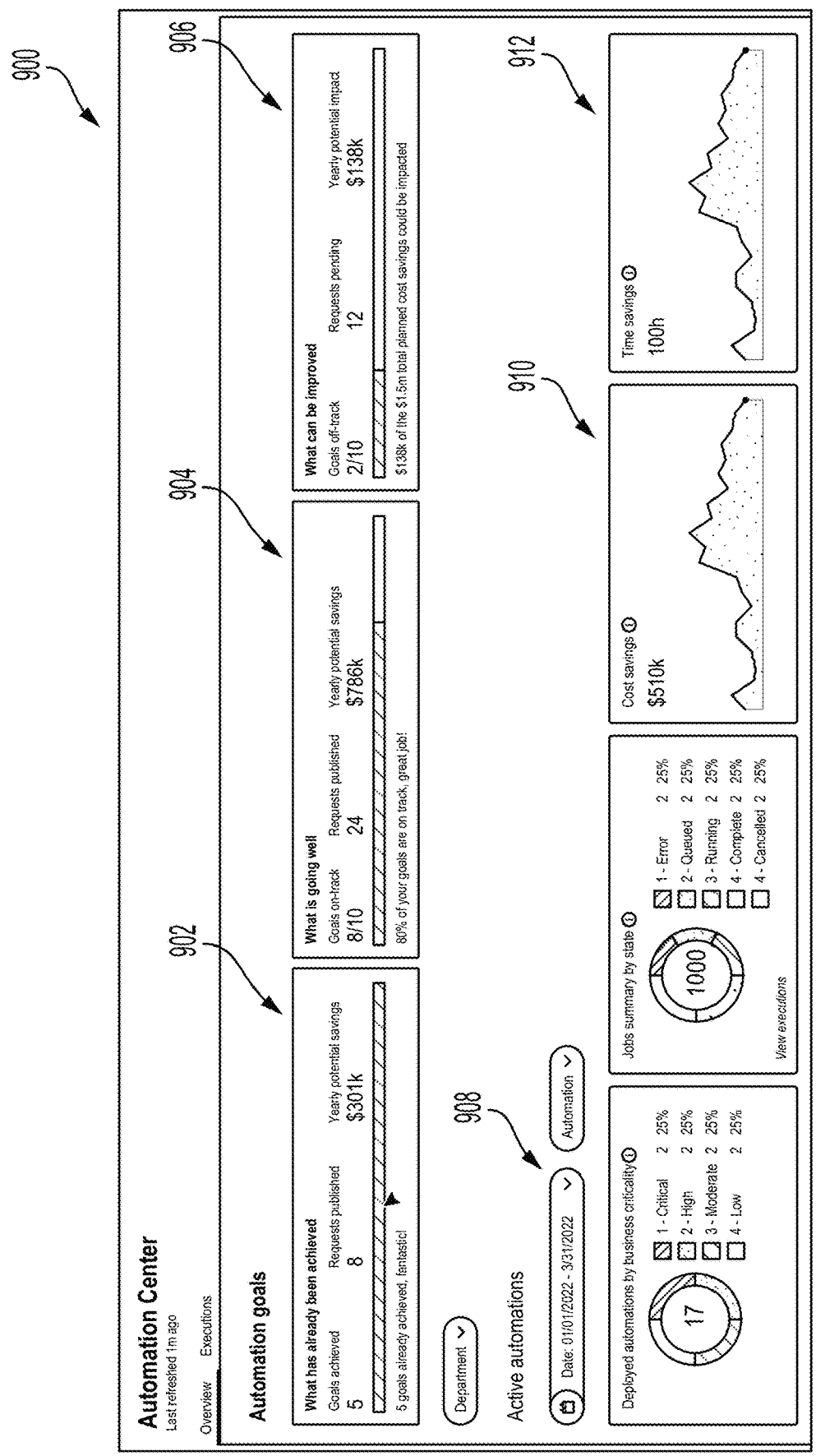
FIG. 9A is a graphical user interface, in accordance with example embodiments.

FIG. 9A depicts a dashboard 900 for current automations. Dashboard 900 includes a number of cards, including cards 902, 904, 906, 910, and 912. Each of these cards is a user interface widget that presents a discrete set of information to the user regarding automations. Date range selector 908 is described in more detail below.

Card 902 indicates automation achievements, including automation goals achieved, automation requests published, and associated yearly potential resource savings. The latter amount can be estimated based on a sum of the expected resource savings per year provided in authentication requests.

Card 904 indicates automations in progress that are tracking toward automation goals. Accordingly, this card indicates automation goals that are on track, automation requests that have been published, and associated yearly potential resource savings. Again, this savings can be estimated based on a sum of the expected resource savings per year provided in authentication requests.

Card 906 indicates automations in progress that are not tracking toward automation goals. Accordingly, this card indicates automation goals that are not on track, automation requests that are still pending, and associated yearly potential resource savings. Again, this savings can be estimated based on a sum of the expected resource savings per year provided in authentication requests.

Card 910 indicates the actual resource savings from the execution of all automations during the time frame specified by date range selector 908. These calculations may be performed for each automation based on: the provided resource savings per execution of each automation, multiplied by the number of times that the automation has been executed within the time frame. This performance information could be stored in any of the associated automation attribute, automation request, or automation goal tables, or a different data structure altogether.

Card 912 indicates the actual time savings from the execution of all automations during the time frame specified by date range selector 908. These calculations may be performed for each automation based on: the provided time savings per execution of each automation, multiplied by the number of times that the automation has been executed within the time frame. Again, this performance information could be stored in any of the associated automation attribute, automation request, or automation goal tables, or a different data structure altogether.

FIG. 9B depicts a dashboard 920 for future automations. Dashboard 920 includes a number of cards, including cards 922, 924, 926, and 928. Like FIG. 9A, each of these cards is a user interface widget that presents a discrete set of information to the user regarding automations.

Card 922 breaks out new automation requests by department (e.g., departments of the enterprise that operates a managed network). Card 924 further breaks out these new automation requests based on whether they were generated as part of process optimization or manually. Card 926 visually depicts how many automation requests are in progress and how many are planned.

Card 928 provides a prioritized list (by rank) of the most recent automation requests. Each entry includes the originating department, the proposed frequency of the automation, the time spent per execution, the resource utilization (cost) per execution, the complexity of the automation, and so on. Thus, card 928 provides a list of the automations that are being worked on or will be worked on soon in order of importance.

X. Example Recommendation Generation

In addition to reporting on automations, automation center 612 may also make general or targeted automation recommendations for managed network 300. For example, automation center 612 may maintain a list of "top automations" that have been selected as most relevant and/or impactful by the remote network management platform serving managed network 300.

In another example, automation center 612 may review the actual time and/or resource savings reported for automations deployed on its various managed networks. From this data, automation center 612 may select those with the highest expected impact (e.g., the greatest actual time savings, the greatest action resource savings, or some weighted calculation of both).

Alternatively, automation center 612 may select those with the highest expected impact from automation deployments on managed networks within the same industry or market segment as managed network 300. For example, if managed network 300 is operated by an enterprise in the medical industry, automation center 612 may determine the most impactful automations as reported by other managed networks associated with the medical industry, and recommend only those to managed network 300.

Regardless, the list of recommended automations may be ranked in order to potential savings, and include a name of the automation, a brief description of the automation, expected weekly, monthly, or yearly time and/or resource savings, a complexity, and so on. This information may be provided in a graphical user interface and the user may have the option to select a recommended automation. Such a selection may result in generation of an automation goal and one of more automation requests in accordance with FIG. 8. Further, any recommended automation may be identified by name (e.g., the name used to refer to a bot or workflow) and/or the vendor that supplied the automation (if applicable).

XI. Example Operations

Figure 10:
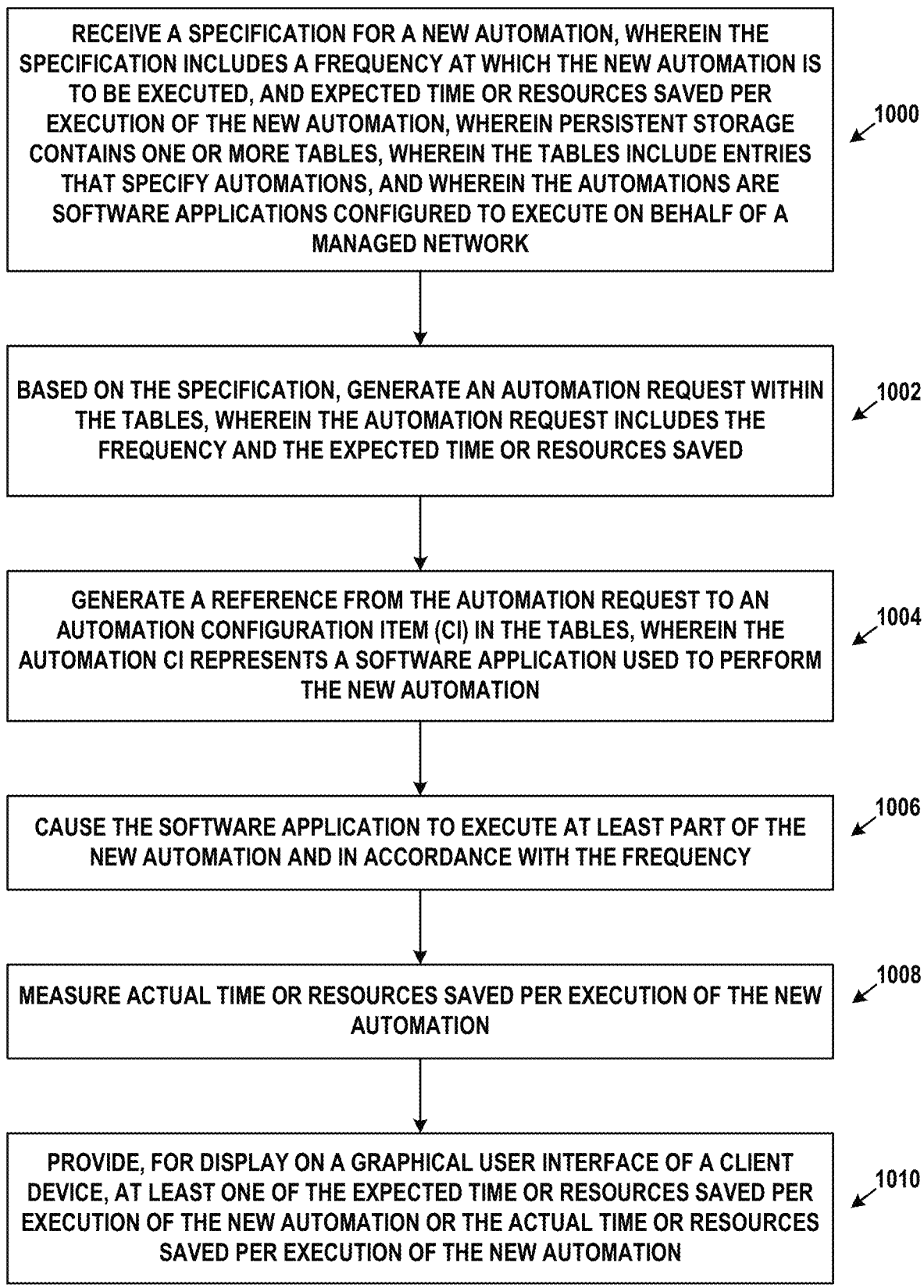
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve receiving a specification for a new automation, wherein the specification includes a frequency at which the new automation is to be executed, and expected time or resources saved per execution of the new automation, wherein persistent storage contains one or more tables, wherein the tables include entries that specify automations, and wherein the automations are software applications configured to execute on behalf of a managed network.

Block 1002 may involve, possibly based on the specification, generating an automation request within the tables, wherein the automation request includes the frequency and the expected time or resources saved.

Block 1004 may involve generating a reference from the automation request to an automation configuration item in the tables, wherein the automation configuration item represents a software application used to perform the new automation.

Block 1006 may involve causing the software application to execute at least part of the new automation and in accordance with the frequency.

Block 1008 may involve measuring actual time or resources saved per execution of the new automation.

Block 1010 may involve providing, for display on a graphical user interface of a client device, at least one of the expected time or resources saved per execution of the new automation or the actual time or resources saved per execution of the new automation.

In some embodiments, the software application is disposed upon the managed network, wherein causing the software application to execute comprises transmitting a signal to the managed network requesting execution of the software application, wherein the signal includes an indication of the frequency.

In some embodiments, the software application is disposed upon a remote network management platform associated with the managed network, wherein causing the software application to execute comprises scheduling the software application to execute on the remote network management platform in accordance with the frequency.

Some embodiments may involve: determining, for one or more further automations, the respective actual time or resources saved per execution thereof based on execution of the one or more further automations in relation to one or more further managed networks; sorting, from highest to lowest, the one or more further automations based on the respective actual time or resources saved per execution thereof; and providing, for display on a further graphical user interface of the client device, at least some of the one or more further automations with highest respective actual time or resources saved per execution.

In some embodiments, the one or more further managed networks support operations in industries in which the managed network supports operations.

In some embodiments, the specification for the new automation also includes a start time and a target time. These embodiments may also involve: possibly based on the specification, generating an automation goal within the tables, wherein the automation goal includes the start time and the target time; and updating the automation request to refer to the automation goal.

In some embodiments, multiple automation requests refer to the automation goal, wherein the automation request is one of the multiple automation requests.

In some embodiments, the automation goal can have a goal state of pending, work in progress, achieved, or not achieved, wherein each of the multiple automation requests can have request states of new, deferred, rejected, planned, work in progress, or published.

In some embodiments, the automation goal is in the goal state of pending only when none of the multiple automation requests still refer to the automation goal or when all of the multiple automation requests are in the request states of new, deferred, or rejected.

In some embodiments, the automation goal is in the goal state of work in progress only when at least one of the multiple automation requests are in the request states of planned, in progress, or published.

In some embodiments, the automation goal is in the goal state of achieved only when all of the multiple automation requests are in the request states of published or rejected with at least one of these being published.

In some embodiments, the automation goal is in the goal state of not achieved when the target time has passed and it was not previously in the goal state of achieved.

Some embodiments may involve: receiving a further specification of one or more automation tasks for the new automation, wherein each of the one or more automation tasks represent discrete activities to be performed for the new automation; and determining an assignment of task resources to the one or more automation tasks, wherein generating the reference from the automation request to the automation CI occurs in response to the assignment of task resources.

XII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
   receiving an indication of an automation, wherein the indication includes a frequency at which the automation is to be executed, and wherein the indication also includes expected time savings per execution of the automation or expected resource savings per execution of the automation;
   causing a software application to execute at least part of the automation in accordance with the frequency;
   measuring actual time savings per execution of the automation or actual resource savings per execution of the automation; and
   generating a representation of a graphical user interface indicating at least one of the expected time savings of executing the automation, the expected resource savings of executing the automation, the actual time savings of executing the automation, or the actual resource savings of executing the automation.

2. The method of claim 1, wherein a database is configured to receive and store data representing log information written by the software application.

3. The method of claim 2, wherein the generating the representation of the graphical user interface comprises determining the actual time savings or the actual resource savings of the executing the automation based on the log information.

4. The method of claim 2, wherein the database is configured to receive and store further data representing the software application as an automation configuration item, and wherein the automation configuration item is linked in the database to the log information.

5. The method of claim 1, wherein the software application is disposed upon a network, and wherein the causing the software application to execute comprises:
   transmitting, to the network, a signal requesting execution of the software application, wherein the signal includes a further indication of the frequency.

6. The method of claim 1, further comprising:
   during the execution of the automation, measuring the actual time saved per execution of the automation and the actual resources saved per execution of the automation.

7. The method of claim 1, wherein the generating the representation of the graphical user interface comprises:
   determining, for a plurality of automations including the automation, respective actual time saved per respective execution thereof or respective actual resources saved per respective execution thereof;
   sorting, from highest to lowest, the plurality of automations based on the respective actual time saved per execution thereof or the respective actual resources saved per execution thereof; and
   incorporating, in the graphical user interface, representations of at least some of the plurality of automations with highest respective actual time saved per execution or highest respective actual resources saved per execution.

8. The method of claim 1, wherein the indication also includes a start time and a target time, the method further comprising:
   based on the indication, generating an automation goal that includes the start time and the target time; and
   associating the automation goal with the automation.

9. The method of claim 8, wherein the automation goal has a goal state of pending, a goal state of work in progress, a goal state of achieved, or a goal state of not achieved.

10. The method of claim 9, wherein the automation goal is associated with a plurality of automations including the automation, and wherein the automation goal is placed in the goal state of pending only when none of the plurality of automations are associated with the automation goal or when all of the plurality of automations are in states of new, deferred, or rejected.

11. The method of claim 9, wherein the automation goal is associated with a plurality of automations including the automation, and wherein the automation goal is placed in the goal state of work in progress only when at least one of the plurality of automations are in states of planned, in progress, or published.

12. The method of claim 9, wherein the automation goal is associated with a plurality of automations including the automation, and wherein the automation goal is placed in the goal state of achieved only when all of the plurality of automations are in states of published or rejected with at least one of the plurality of automations being published.

13. The method of claim 9, wherein the automation goal is associated with a plurality of automations including the automation, and wherein the automation goal is placed in the goal state of not achieved when the target time has passed and the automation goal was not previously in the goal state of achieved.

14. The method of claim 1, further comprising:
transmitting the representation of the graphical user interface to a client device, wherein reception of the representation of the graphical user interface causes the client device to display the graphical user interface.

15. A non-transitory computer-readable medium storing program instructions that, when executed by one or more processors of a computing system, cause the computing system to perform operations comprising:
receiving an indication of an automation, wherein the indication includes a frequency at which the automation is to be executed, and wherein the indication also includes expected time savings per execution of the automation or expected resource savings per execution of the automation;
causing a software application to execute at least part of the automation in accordance with the frequency;
measuring actual time savings per execution of the automation or actual resource savings per execution of the automation; and
generating a representation of a graphical user interface indicating at least one of the expected time savings of executing the automation, the expected resource savings of executing the automation, an actual time savings of executing the automation, or an actual resource savings of executing the automation.

16. The non-transitory computer-readable medium of claim 15, wherein the software application is disposed upon a network, and wherein the causing the software application to execute comprises:
transmitting, to the network, a signal requesting execution of the software application, wherein the signal includes a further indication of the frequency.

17. The non-transitory computer-readable medium of claim 16, the operations further comprising:
during the execution of the automation, measuring the actual time saved per execution of the automation and the actual resources saved per execution of the automation.

18. The non-transitory computer-readable medium of claim 16, wherein the generating the representation of the graphical user interface comprises:
determining, for a plurality of automations including the automation, respective actual time saved per execution thereof or respective actual resources saved per execution thereof;
sorting, from highest to lowest, the plurality of automations based on the respective actual time saved per execution thereof or the respective actual resources saved per execution thereof; and
incorporating, in the graphical user interface, representations of at least some of the plurality of automations with highest respective actual time saved per execution or highest respective actual resources saved per execution.

19. The non-transitory computer-readable medium of claim 16, wherein the indication also includes a start time and a target time, the operations further comprising:
based on the indication, generating an automation goal that includes the start time and the target time; and
associating the automation goal with the automation.

20. A computing system comprising:
one or more processors;
memory; and
program instructions, stored in the memory, that upon execution by the one or more processors cause the computing system to perform operations comprising:
receiving an indication of an automation, wherein the indication includes a frequency at which the automation is to be executed, and wherein the indication also includes expected time savings per execution of the automation or expected resource savings per execution of the automation;
causing a software application to execute at least part of the automation in accordance with the frequency;
measuring actual time savings per execution of the automation or actual resource savings per execution of the automation; and
generating a representation of a graphical user interface indicating at least one of the expected time savings of executing the automation, the expected resource savings of executing the automation, an actual time savings of executing the automation, or an actual resource savings of executing the automation.

* * * * *